(12) United States Patent
Kruse et al.

(10) Patent No.: US 8,405,612 B2
(45) Date of Patent: Mar. 26, 2013

(54) METHOD AND APPARATUS FOR WEARABLE REMOTE INTERFACE DEVICE

(75) Inventors: Barbara Kruse, San Francisco, CA (US); Ryan Steger, Sunnyvale, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/251,534

(22) Filed: Oct. 3, 2011

(65) Prior Publication Data

US 2012/0019373 A1 Jan. 26, 2012

Related U.S. Application Data

(62) Division of application No. 11/871,495, filed on Oct. 12, 2007, now Pat. No. 8,031,172.

(51) Int. Cl.
*G06F 3/033* (2006.01)
*G09G 5/08* (2006.01)
(52) U.S. Cl. ........................................ 345/163; 345/173
(58) Field of Classification Search .................. 345/156, 345/163, 173
See application file for complete search history.

(56) References Cited

U.S. PATENT DOCUMENTS

| | | | | |
|---|---|---|---|---|
| 5,453,759 A * | 9/1995 | Seebach | .......................... | 345/158 |
| 5,706,026 A * | 1/1998 | Kent et al. | ...................... | 345/156 |
| 6,249,277 B1 * | 6/2001 | Varveris | ........................... | 345/179 |
| 6,297,808 B1 * | 10/2001 | Yang | ................................ | 345/167 |
| 6,320,570 B2 * | 11/2001 | Robb | ................................ | 345/179 |
| 6,380,923 B1 | 4/2002 | Fukumoto et al. | | |
| 6,587,090 B1 * | 7/2003 | Jarra | ................................ | 345/156 |
| 6,626,598 B2 * | 9/2003 | Schneider | .......................... | 401/8 |
| 7,148,875 B2 | 12/2006 | Rosenberg et al. | | |
| 7,250,935 B2 * | 7/2007 | Kubota et al. | ................... | 345/156 |
| 2002/0163495 A1 | 11/2002 | Doynov | | |
| 2002/0198697 A1 | 12/2002 | Datig | | |
| 2003/0025595 A1 | 2/2003 | Langberg | | |
| 2007/0132722 A1 | 6/2007 | Kim et al. | | |
| 2008/0136679 A1 | 6/2008 | Newman et al. | | |
| 2008/0150899 A1 * | 6/2008 | Lin | ................................ | 345/168 |
| 2011/0007035 A1 * | 1/2011 | Shai | ............................... | 345/179 |
| 2011/0092882 A1 * | 4/2011 | Firlik et al. | ...................... | 604/20 |
| 2011/0210931 A1 * | 9/2011 | Shai | ............................... | 345/173 |

OTHER PUBLICATIONS

International Search Report dated Oct. 9, 2008 issued in corresponding International Application No. PCT/US08/070174.
Warwick, K. "Professor Kevin Warwick" [on-line Oct. 2, 2008], Sep. 22, 2005, pp. 1-3; http://www.kevinwarwick.com/.

* cited by examiner

*Primary Examiner* — Ricardo L Osorio
(74) *Attorney, Agent, or Firm* — Pillsbury Winthrop Shaw Pittman LLP

(57) ABSTRACT

A method and apparatus of using a wearable remote interface device capable of detecting inputs from movements are disclosed. The wearable remote interface device, which could be attached to a finger or a hand or any parts of a body, includes a sensor, a filter, an input identifier, and a transmitter. The sensor, in one embodiment, is capable of sensing the movement of the finger or any part of body in which the wearable remote interface device is attached with. Upon detecting the various movements associated with the finger, the filter subsequently removes any extraneous gestures from the detected movements. The input identifier, which could be a part of the filter, identifies one or more user inputs from the filtered movements. The transmitter transmits the input(s) to a processing device via a wireless communications network.

4 Claims, 7 Drawing Sheets

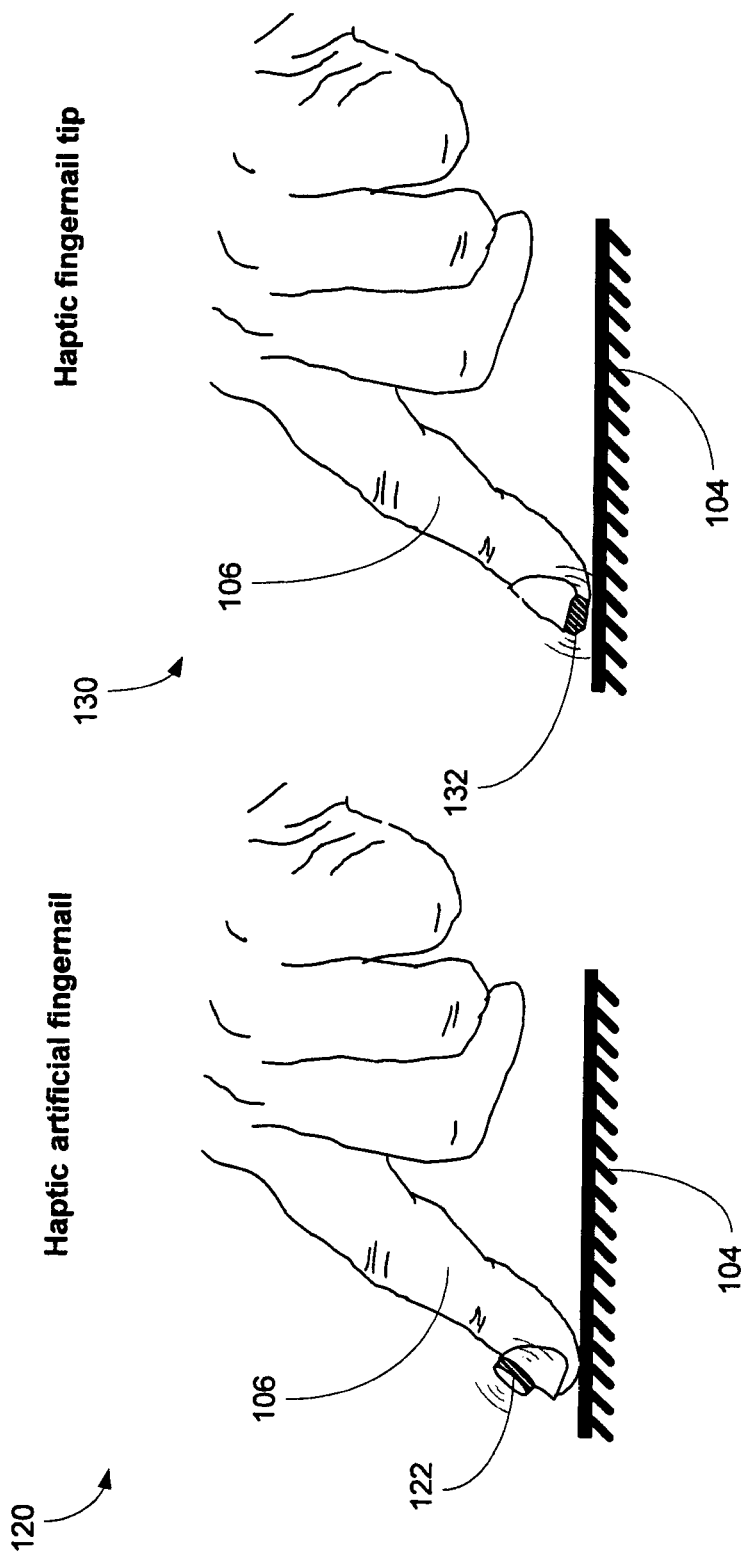

METHOD AND APPARATUS FOR WEARABLE REMOTE INTERFACE DEVICE

This application is a divisional application of application Ser. No. 11/871,495, filed on Oct. 12, 2007, now U.S. Pat. No. 8,031,172 the entire content of which is hereby incorporated by reference.

FIELD

The present invention relates to the field of electronic interface devices. More specifically, the present invention relates to a user interface device having haptic actuators.

BACKGROUND

As computer-based systems, such as game consoles, appliances, personal computers ("PCs"), servers, personal digital assistants ("PDAs"), cellular phones, automated teller machines (ATM), have become more prevalent in recent years, the portability of systems as well as human-machine interface devices becomes increasingly important. Currently available user interface devices, such as keyboards, computer mice, joysticks, phone pads, remote controls, and/or touch screens, have various physical limitations and constraints. For example, a problem associated with the conventional user interface devices is portability because they are typically large and awkward to carry. Another problem associated with typical conventional user interface devices is lack of ergonomic considerations because various physical motions associated with button presses and key strokes can increase user's physical fatigue and discomfort.

SUMMARY

A method and apparatus of using a wearable remote interface device used for detecting inputs through various movements are disclosed. The wearable remote interface device, which could be attached to a finger or a hand or any parts of a body, includes a sensor, a filter, an input identifier, and a transmitter. The sensor, in one embodiment, is capable of sensing the movement of the finger or any part of body in which the wearable remote interface device is attached. Upon detecting the various movements associated with the finger, the filter subsequently removes any extraneous gestures from the detected movements. The input identifier, which could be a part of the filter, identifies one or more user inputs from the filtered movements. The transmitter transmits the input(s) to a processing device via a wireless communications network.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 1C illustrates a remote input mechanism using a haptic fingernail interface device in accordance with one embodiment of the present invention;

FIG. 1D is another example of remote input mechanism illustrating a haptic fingernail tip interface device in accordance with one embodiment of the present invention;

DETAILED DESCRIPTION

Embodiments of the present invention are described herein in the context of a method, system and apparatus for communicating with a processing device using a remote wearable interface device. Those of ordinary skilled in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the exemplary embodiments of the present invention as illustrated in the accompanying drawings. The same reference indicators (or numbers) will be used throughout the drawings and the following detailed description to refer to the same or like parts.

In the interest of clarity, not all of the standard hardware and routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

A method and apparatus using a wearable remote interface device capable of detecting inputs from movements of the wearable remote device are disclosed. The wearable remote interface device, which could be attached to a, finger or a hand or any parts of a body, includes a sensor, a filter, an input identifier, and a transmitter. The sensor, in one embodiment, is capable of sensing the movement of the finger or any part of body in which the wearable remote interface device is attached with. Upon detecting the various movements associated with the finger, for example, the filter subsequently removes any extraneous gestures from the detected movements. The input identifier, which could be a part of the filter, identifies one or more user inputs from the filtered movements. The transmitter transmits the input(s) to a processing device via a wireless communications network.

Figure 1B:
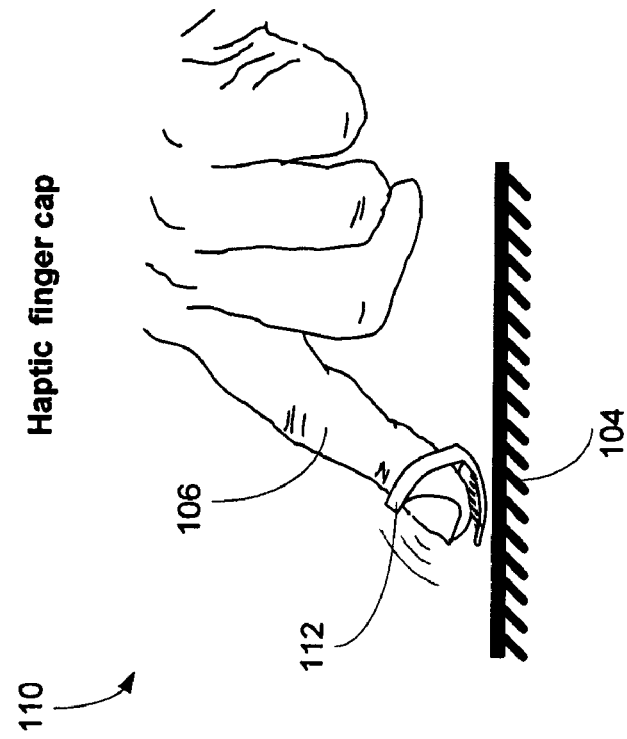
FIG. 1B illustrates a remote input mechanism using an interface device of haptic finger cap in accordance with one embodiment of the present invention.
Figure 1A:
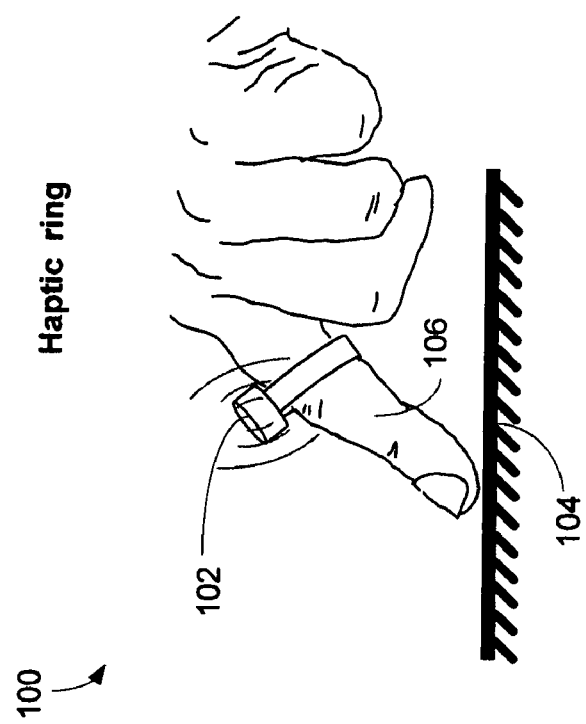
FIG. 1A illustrates a remote input mechanism using a haptic ring interface device in accordance with one embodiment of the present invention.

FIG. 1A illustrates a remote input mechanism 100 using a haptic ring interface device 102 in accordance with one embodiment of the present invention. Mechanism 100 includes a wearable haptic ring 102, an index finger 106, and a surface 104, wherein wearable haptic ring 102 is capable of sensing inputs from movements of index finger 106. It should be noted that the underlying concept of the exemplary embodiment of the present invention would not change if additional blocks (circuits or mechanical devices) were added to mechanism 100.

Wearable haptic ring 102, also known as a remote interface device or a wearable remote interface device or the like, is designed and structured in a ring shape that can be worn and/or fit on a finger as shown in FIG. 1A. Various different physical designs of wearable haptic ring 102 may be used to fit for thumbs, index fingers, middle fingers, ring fingers, and/or small fingers to accommodate different sizes and shapes of human fingers. In addition, the shape of wearable haptic ring 102 is further adjusted to fit between the joints of distal interphalangeal ("DIP") joint and proximal interphalangeal ("PIP") joint or between the joints of PIP joint and metacarpophphalangeal ("MCP") joint. Different detecting capabilities of wearable haptic ring 102 may be required depending on the physical location of where wearable haptic ring 102 is attached. For example, the sensitivity of wearable haptic ring 102 attached at the joints between PIP joint and MCP joint can be very different than the sensitivity of wearable haptic ring 102 located at the joints between PIP joint and DIP joint partially due to the fact that for the same finger movements, the actual displacement of wearable haptic ring 102 is different depending on where it is located on the finger. For instance, the displacement of a fingertip is greater than the displacement of up portion (between PIP and MCP) of the finger for the same movement of a finger.

Surface 104, in one embodiment, is a substantially flat surface such as a tabletop, a wall, or any similar surface that feels flat. When finger 106 touches or collides with surface 104, wearable haptic ring 102 senses the motion or movement using an accelerometer or similar sensor(s). Upon detecting motion(s) and/or movement(s), wearable haptic ring 102 generates one or more user inputs such as a mouse click in response to the detected information. It should be noted that the detected information includes contacts, motions, positions, and the like. Vibrotactile feedback, in one embodiment, may be provided through a piezo, shape memory alloy ("SMA"), eccentric rotating mass ("ERM") or linear resonant actuator ("LRA"), or the like, to confirm the inputs. It should be noted that the terms "motion(s)" and "movement(s)" are used interchangeably herein. Also, the terms "detecting" and "sensing" are used interchangeably herein.

Wearable haptic ring 102 includes a sensor for sensing the movements and an actuator for providing vibrotactile or haptic feedback. In one embodiment, wearable haptic ring 102 includes a combined sensor and actuator device, which is capable of sensing the inputs such as a key stroke and providing the vibrotactile or haptic feedback to confirm the key stroke. Piezoelectric material, in one embodiment, may be used to construct the sensor/actuator device. Some materials such as piezoelectric material, have the physical property of sensing as well as providing vibrotactile effect. For example, piezoelectric material discharges a current indicating it detected a pressure when its physical shape deforms due to a pressure. The dimension of piezoelectric material can be reduced to a relatively small size such as 5 millimeters by 5 millimeters. Piezoelectric materials, in one embodiment, include crystals and/or ceramics such as quartz (SiO$_2$). When a voltage potential applies to the piezoelectric material, it deforms from its original shape to an expanded shape. Piezoelectric material may return to its original state as soon as the voltage potential is removed. Piezoelectric material, however, releases a current when it is being pressed. As a result, piezoelectric material can detect an input when it is being pressed.

Similar functions of sensor/actuator may be performed if the piezoelectric material is replaced with other devices such as LRA, ERM, and SMA, wherein SMA, for example, is capable of maintaining its deformed shape for a period of time after the voltage potential is removed. It should be noted that the underlying concept of the embodiments of the present invention does not change if different materials other than piezoelectric actuators are employed.

During the operation, wearable haptic ring 102 worn on a finger uses various sensors including an accelerometer to sense impacts between the fingertip(s) and a surface. Detected impacts and movements are used to identify input commands such as mouse button clicks, key strokes, and other selections. Haptic feedback, for example, is generated to confirm the input command(s) or selections such as a dash rotary button selection. The exemplary embodiment(s) of wearable haptic ring 102, also referred to as smart fingertips or mouse replacement, provides a remote input/output ("I/O") device to interact with any computers and/or smart objects. The remote I/O device, for example, can be used in place of a computer mouse, a remote control, a keyboard, a phone pad, a touch pad, a touch screen, a touch-screen table computer, etc.

Referring back to FIG. 1A, wearable haptic ring(s) 102 is configured to be a minimal touch interface device, which puts the input/output interaction at or near the fingertips for communicating with a computer or other electronic device, such as a server, a personal digital assistant ("PDA"), a smart phone, et cetera. Wearable haptic ring 102 attached to a finger or a fingertip can be unique because it operates between the finger(s) doing the touching and the object being touched, rather than confining the touch sensor in the object being touched. Any object or surface 104 can, in this embodiment, become a 'virtually active surface' as the fingertip remote can provide tactile information for any surface capable of communicating with a processing device. In other words, input gestures such as point/drag and button click can be made, for example, like on a touchpad, but is detected on virtually any surface, including user's own fingertips.

An advantage of using a wearable haptic ring 102 is to improve ergonomics because the ring is highly portable and it can be used with any surface(s). Surface 104 can be virtually any surface and it is a part of an interactive device with or without dynamic tactile feedback. Using a wearable haptic ring 102 as a remote interface device can minimize metatarsal syndrome since it reduces user's muscle fatigue and/or discomfort. Wearable haptic ring 102 is applicable to a game console, a universal remote, an interaction in an automobile, an interaction with any appliance, etc.

FIG. 1B illustrates a remote input mechanism 110 having an interface device of haptic finger cap 112 in accordance with one embodiment of the present invention. Mechanism 110 includes a haptic finger cap 112, an index finger 106, and a surface 104, wherein haptic finger cap 112 is capable of sensing inputs from movements of index finger 106. It should be noted that the underlying concept of the exemplary embodiment of the present invention would not change if additional blocks were added to mechanism 110.

Haptic finger cap 112 is configured to be worn on the tip of a finger and it is similar to a thimble or finger cot. In one embodiment, haptic finger cap 112, having a calibrator, a power device, and a pressure sensor, is capable of detecting various movements associated to the finger, such as contact, motion, and/or position. The pressure sensor, for example, may include a piezo strip, which is configured to deform its physical shape when it is being pressed. It should be noted that the piezo strip is also capable of providing vibrotactile feedback.

The power device, not shown in FIG. 1B, provides and regulates sufficient power for haptic finger cap 112 to operate normally. For example, the power device may include a battery or a rechargeable battery. Alternatively, the power device may be capable of generating power via kinetic energy from a moving finger. Furthermore, solar energy, radio frequency, and the like may be used to generate sufficient power for haptic finger cap 112 to operate.

Calibrator, in one embodiment, initializes or calibrates haptic finger cap 112 to a specific virtual interface device, such as a virtual keyboard, a virtual mouse, a virtual keypad, a virtual remote control, another haptic finger cap, et cetera. In one embodiment, haptic finger cap 112 can be calibrated to communicate with a computer, a server, an appliance, or a television set, wherein the home appliance may include a phone, a refrigerator, a microwave oven, a dishwasher, or a washer/dryer. For example, to calibrate a virtual keyboard, a user wears one or more haptic finger caps 112 taps his/her index finger twice to activate the calibration process, and begins to tap "A" key, as of standard keyboard against a surface, and then "B" key. Once every single key on a virtual key board is taped or calibrated, haptic finger cap(s) 112 remembers the position of each key with respect to the surface. In another embodiment, different keyboard standards such as a French language keyboard standard may be calibrated.

Haptic finger cap 112, in another embodiment, is used to enhance building or facility securities. In one embodiment, haptic finger cap 112 is configured to communicate with a hidden switch, wherein the hidden switch is visible or detectable through haptic finger cap 112. An invisible or hidden switch may be used to open or shut a door and the switch can only be switched on or off by haptic finger cap 112. For instance, a user feels a hidden switch via haptic finger cap 112 when the user moves closer to a door. The hidden switch could be a simple on/off switch or a keypad, which requires a secret code for authentication. Upon feeling a virtual switch via haptic feedback due to the presence of nearby hidden switch, the user can enter the secret code on a virtual keypad of the hidden switch to open the door. For a simple on/off switch, the user can simply switch on or off the virtual switch remotely via haptic finger cap 112. It should be noted that an initial calibration process may be needed for haptic finger cap 112 to configure it as a virtual switch.

In another embodiment, a medical device containing remote haptic mechanism 110 can be embedded in a user's body under the skin for detecting user's input signals. For example, a disabled person may need to use his or her foot or mouth to generate inputs. It should be noted that the embedded device may also be applicable to livestock and/or animals.

FIG. 1C illustrates an input mechanism 120 having a haptic fingernail interface device 122 capable of sensing inputs in accordance with one embodiment of the present invention. Mechanism 120 includes a haptic fingernail 122, an index finger 106, and a surface 104, wherein haptic fingernail 122 is configured to sense inputs from movements of index finger 106. It should be noted that the underlying concept of the exemplary embodiment of the present invention would not change if additional blocks were added to mechanism 120.

Haptic fingernail 122, in one embodiment, is attached to a finger nail bed. Haptic fingernail 122, for example, may be attached on top of the nail or attached at or with an artificial nail. Haptic fingernail 122 is configured to perform similar functions as haptic finger cap 112 and/or wearable haptic ring 102. In one embodiment, haptic fingernail 122 detects movements of finger 106 such as a contact with a surface 104, or a downward motion of a hand, or a new position from its previous position via an accelerometer and/or through detection of a local deflection of nail surface caused by contact.

FIG. 1D is another example of remote input mechanism 130 illustrating a haptic fingernail tip interface device 132 capable of sensing inputs in accordance with one embodiment of the present invention. Mechanism 130 includes a haptic fingernail tip interface device 132, an index finger 106, and a surface 104, wherein haptic fingernail tip interface device 132 can detect inputs from movements of index finger 106. It should be noted that the underlying concept of the exemplary embodiment of the present invention would not change if additional blocks were added to mechanism 130.

Haptic fingernail tip interface device 132 is, in one embodiment, placed underneath the tip of a fingernail. Similar to haptic fingernail 122, haptic finger cap 112 and wearable haptic ring 102, haptic fingernail tip interface device 132 is capable of detecting finger movements such as contact, motion, and position, via finger pressure with respect to surface 104. In one example, vibrotactile or "click" sensations may be provided via piezo or electrically trigger mechanical mechanisms.

Figure 1E:
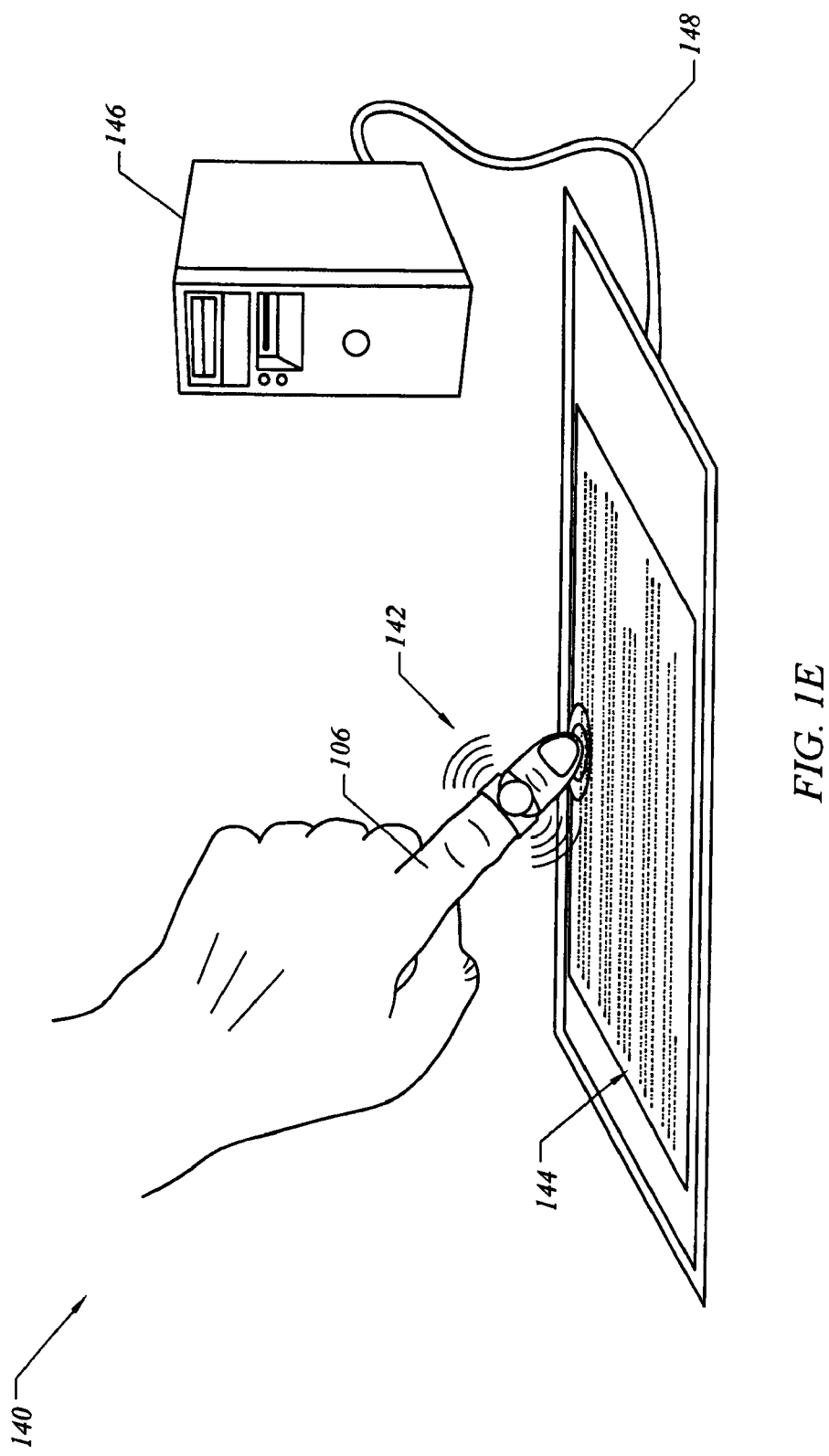
FIG. 1E is another example of remote input mechanism illustrating a touch screen with a wearable haptic ring in accordance with one embodiment of the present invention.

FIG. 1E is another example of remote input mechanism 140 illustrating a touch screen with a wearable haptic ring 142 in accordance with one embodiment of the present invention. Mechanism 140 includes a wearable ring 142, a finger 106, a touch screen 144, and a computer 146 wherein computer 146 is connected to touch screen 144 via a cable 148. Wearable haptic ring 142 together with touch screen 144, in one embodiment, creates a touch screen with remote fingertip haptic effect, in which touch screen 144 provides location information to computer 146 while wearable haptic ring 142 provides haptic effects such as contact click in response to touch screen 144, which may be a non-haptic touch screen.

The exemplary embodiment(s) of the present invention may replace tactile touch screens with a device using touch inputs such as touch screen 144 and tactile output such as wearable haptic ring 142. Different images displayed in touch screen 144 may receive different feelings without moving or vibrating the screen.

An advantage of the exemplary embodiment(s) of the present invention is portability since wearable interface device is lightweight and can be worn without being removed when it is not in use. Since computer mice and/or keyboards are large and awkward to carry, wearable interface device can be calibrated to replace such input devices. It should be noted that button presses can be replaced with surface taps.

Another advantage of wearable interface device is simplicity wherein sensors and actuators are located on the sensory organ. For example, ten wearable rings with ten (10) sensors and ten (10) actuators may be needed to achieve the function of a keyboard or other input/output configurations.

Figure 2:
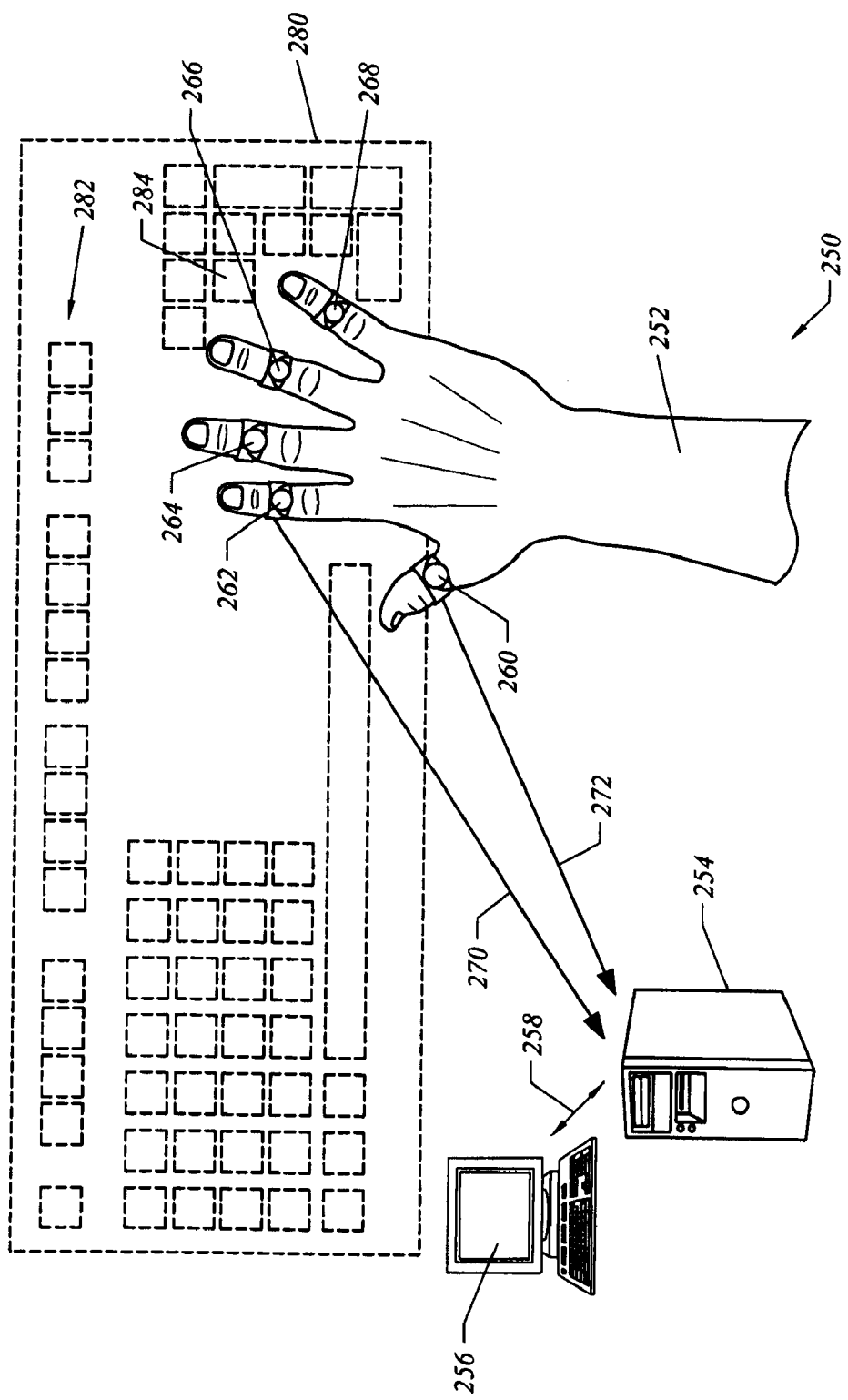
FIG. 2 is a block diagram illustrating a virtual keyboard using multiple remote finger rings in accordance with one embodiment of the present invention.

FIG. 2 is a block diagram 250 illustrating a virtual keyboard 280 using multiple wearable haptic rings 260-268 in accordance with one embodiment of the present invention. Diagram 250 includes a hand 252, a server 254, a personal computer ("PC") 256, and a virtual keyboard 280. Hand 252 further includes five wearable haptic rings 260-268 wherein wearable haptic ring 260 is on the thumb, wearable haptic ring 262 is on the index finger, wearable haptic ring 264 is on the middle finger, wearable haptic ring 266 is on the ring finger, and wearable haptic ring 268 is on the small finger. It should be noted that the underlying concept of the exemplary embodiment of the present invention would not change if additional blocks (circuits or mechanical devices) were added to diagram 250. It should be further noted that the underlying concept of the exemplary embodiment of the present invention would not change if wearable haptic rings 268 is replaced with haptic finger caps 112, haptic fingernails 122, haptic fingernail tips 132, or a combination of rings, caps, fingernails and tips.

After initial calibration process, wearable haptic rings 260-268, also known as remote finger rings, are programmed to track the relationship between each finger and the key locations of a virtual keyboard 280. For instance, wearable haptic rings 260-268 track the locations of every keys, such as the locations of function keys 282 and locations of number keys 284, and detect "virtual key strokes" when various locations are being contacted or tapped by finger(s). When hands and/or fingers are in motion, wearable haptic rings 260-268 detect inputs from movements of the fingers in accordance with the virtual keyboard 280 and transmit the inputs to server 254. In one embodiment, vibrotactile feedback may be used to confirm the inputs. It should be noted that an additional left hand, which is not shown in FIG. 2, with five wearable haptic rings may be added to diagram 250.

In an alternative embodiment, a piece of paper having a printed standard keyboard picture is used in place of virtual keyboard 280. Wearable haptic rings 260-268 are calibrated in accordance with the printed keyboard picture on the paper. A user can 'type' or tap on the paper as a regular standard keyboard and the motions of tapping such as key strokes over the paper are detected by wearable haptic rings 260-268. For example, various user inputs are delineated through various movements, such as pressure on fingertips, collisions on impacts, speed of tapping, and positions from finger to finger. After processing the information of contact, collision and position, wearable haptic rings 260-268 can identify and distinguish gestures, such as pressing buttons and typing on a particular key on a keyboard.

The exemplary embodiment(s) of the present invention places a sensor and/or actuator at or near a user's fingertips to detect contacts and collisions with a surface and to translate the detected motions into control signals for a computer or a similar device. The user touches a surface with specific command gestures, which may or may not mimic natural motions as pointing, dragging, and button clicking, wearable haptic ring(s) or remote finger ring(s) identify the gestures or movements associated with an input command, and filter out other extraneous motions of a hand. The input command is subsequently used to control server 254 and/or PC 256. Server 254 or PC 256, in one embodiment, sends haptic data to wearable haptic rings 260-268 for generating a specific type of vibrotactile feedback to confirm the receipt of input command. Haptic data, for example, may also include information relating to virtual textures, input request, an alert, or the like.

Figure 3:
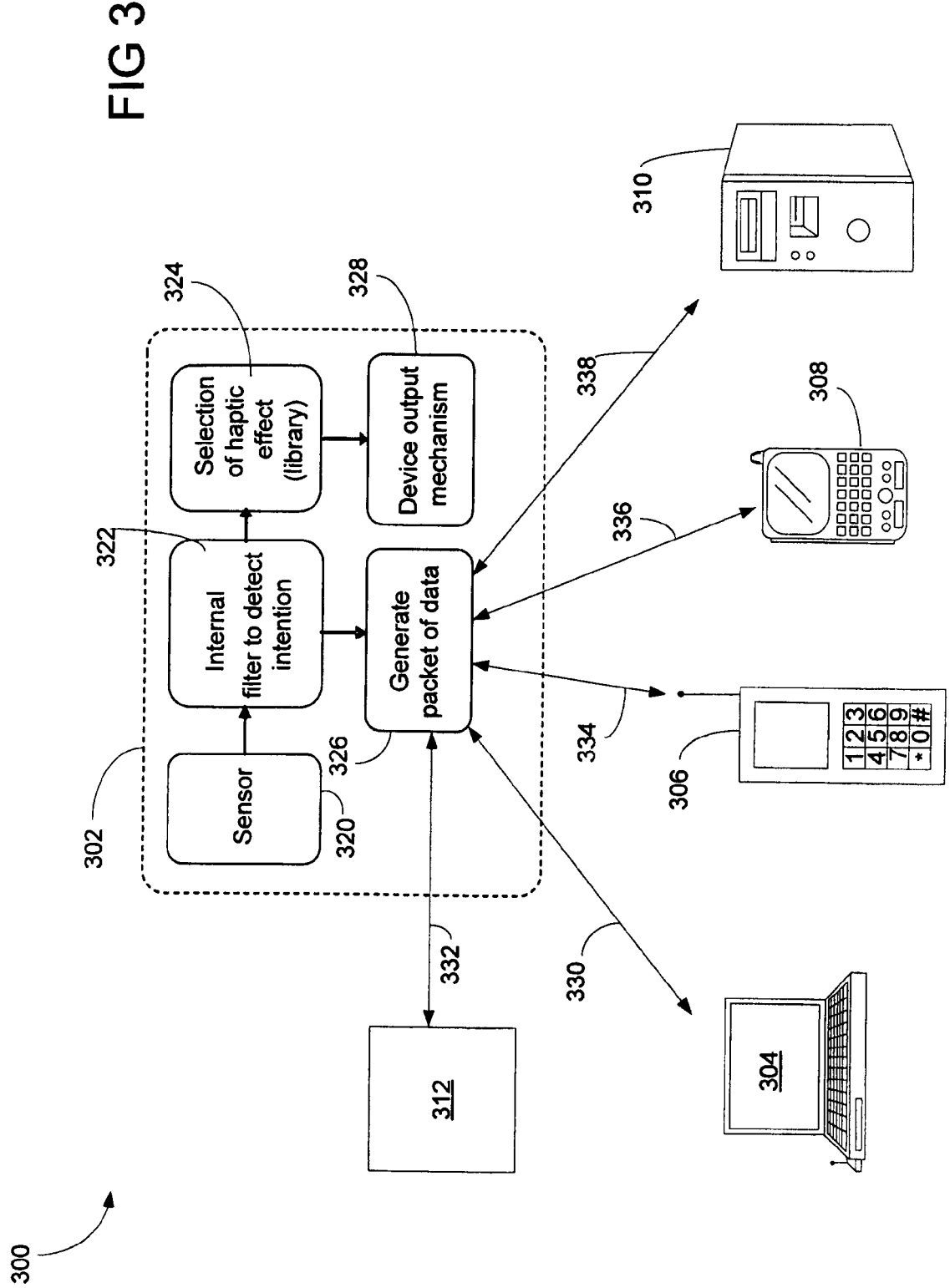
FIG. 3 is a block diagram illustrating a remote wearable interface device capable of sensing inputs in accordance with one embodiment of the present invention.

FIG. 3 is a block diagram 300 illustrating a remote wearable interface device 302 capable of sensing inputs in accordance with one embodiment of the present invention. Diagram 300 includes a wearable interface device 302, a PC 304, a cellular phone 306, a PDA 308, a server 310, and a processing device 312, which is capable of executing instructions. It should be noted that the underlying concept of the exemplary embodiment of the present invention would not change if additional blocks such as power supply were added to or removed from diagram 300.

Wearable interface device 302 further includes a sensor 320, an internal filter 322, a selector 324, a generator 326, and a haptic output device 328. In one embodiment, sensor 320 is configured to detect position, collision, touch, and contact motions in accordance with the movements of wearable interface device 302. Filter 322 is used to filter any extraneous movements, which are considered as natural hand movements as oppose to command input movements such as clicking a mouse button. In another embodiment, internal filter 322 is located in a host computer, wherein the filtering process is implemented by a host processor. Generator 326 generates commands in response to the filtered movements and transmits the input commands to one or more processing devices such as PC 304 or PDA 308 via various communication channels 332-338, which may be wired or wireless communications.

Selector 324 includes one or more libraries used for filing and storing haptic data containing a list of haptic effects. In one embodiment, the list of haptic effects is used to provide a haptic feedback to a user confirming the selected input(s). Each input may have a unique confirmation haptic effect. For example, different input command activates a unique haptic effect to indicate the input command. It should be noted that the library containing haptic data may be located in a host computer. Haptic output device 328 generates haptic feedback in accordance with the haptic data from selector 324. For example, a vibration effect emulates a mouse click.

A function of wearable haptic ring 102 is that once it is attached to a finger, it uses multiple sensors such as gesture recognition, acceleration, and collision sensing capabilities, to detect and/or sense inputs associated with various finger movements. An application of wearable haptic ring 102 is to emulate a virtual mouse. To emulate a virtual mouse, multiple wearable haptic rings 102 or a glove with multiple haptic fingers may be needed. A user worn wearable haptic ring 102, for example, calibrates and emulates a mouse button click by tapping his or her finger on a surface 104. Unlike traditional mouse movements, wearable haptic ring 102 tracks finger motions as well as finger forces. It should be noted that wearable haptic ring 102 can be attached to a finger, a hand, a head, an arm, and the like. Also, wearable haptic ring 102 can emulate any types of virtual input devices such as a virtual keyboard, a virtual keypad, a virtual switch, et cetera.

Figure 4:
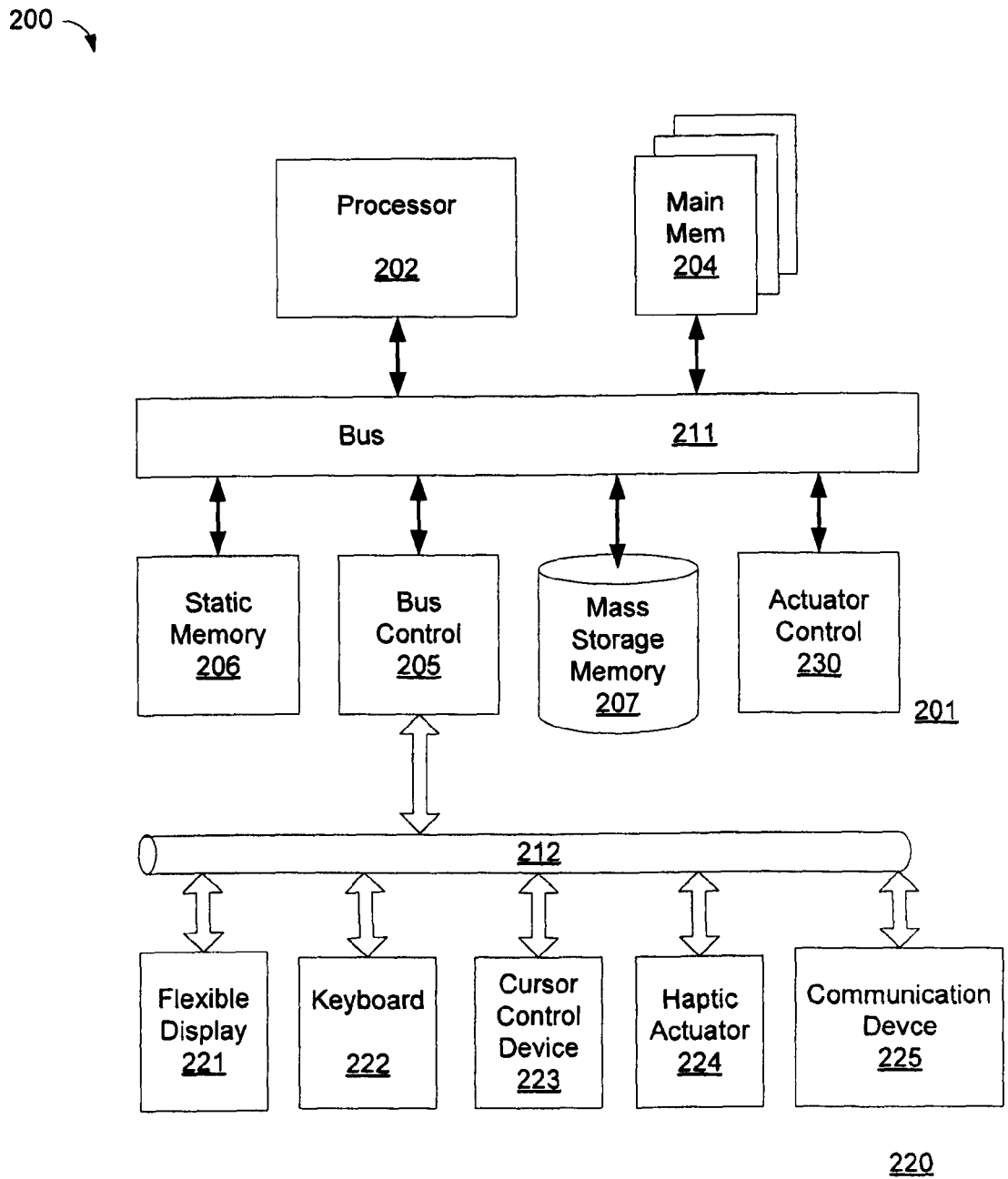
FIG. 4 illustrates a processing device capable of communicating with a wearable interface device in accordance with one embodiment of the present invention.

Having briefly described several embodiments of remote wearable haptic rings capable of communicating with one or more processing devices in which the exemplary embodiment(s) of the present invention operates, FIG. 4 illustrates a processing device 200. Computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and an actuator control 230. Bus 211 is used to transmit information between various components and processor 202 for data processing. Processor 202 may be any of a wide variety of general-purpose processors or microprocessors such as Pentium™ microprocessor, Intel® Core™2 Duo, Intel® Core™2 Quad, Intel® Xeon®, AMD Athlon™ processor, Motorola™ 68040, or Power PC™ microprocessor. Actuator control 230 generates haptic feedback in response to user inputs.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions.

Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Actuator control module 230, in one embodiment, is an independent component (IC) that performs functions of haptic effect control. A function of actuator control 230 is to drive one or more haptic actuators 224, which could be a remote wearable ring. In another embodiment, actuator control module 230 may reside within processor 202, main memory 204, and/or static memory 206.

I/O unit 220, in one embodiment, includes a flexible display 221, keyboard 222, cursor control device 223, and communication device 225. Keyboard 222 may be a conventional alphanumeric input device for communicating information between computer system 200 and computer operator(s). Another type of user input device is cursor control device 223, such as a conventional mouse, touch mouse, trackball, a finger or other type of cursor for communicating information between system 200 and user(s). Communication device 225 is coupled to bus 211 for accessing information from remote computers or servers, such as server 104 or other computers, through wide-area network. Communication device 225 may include a modem or a wireless network interface device, or other similar devices that facilitate communication between computer 200 and the network.

The exemplary embodiment(s) of the present invention includes various processing steps, which will be described below. The steps of the embodiments may be embodied in machine or computer executable instructions. The instructions can be used to cause a general purpose or special purpose system, which is programmed with the instructions, to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 5:
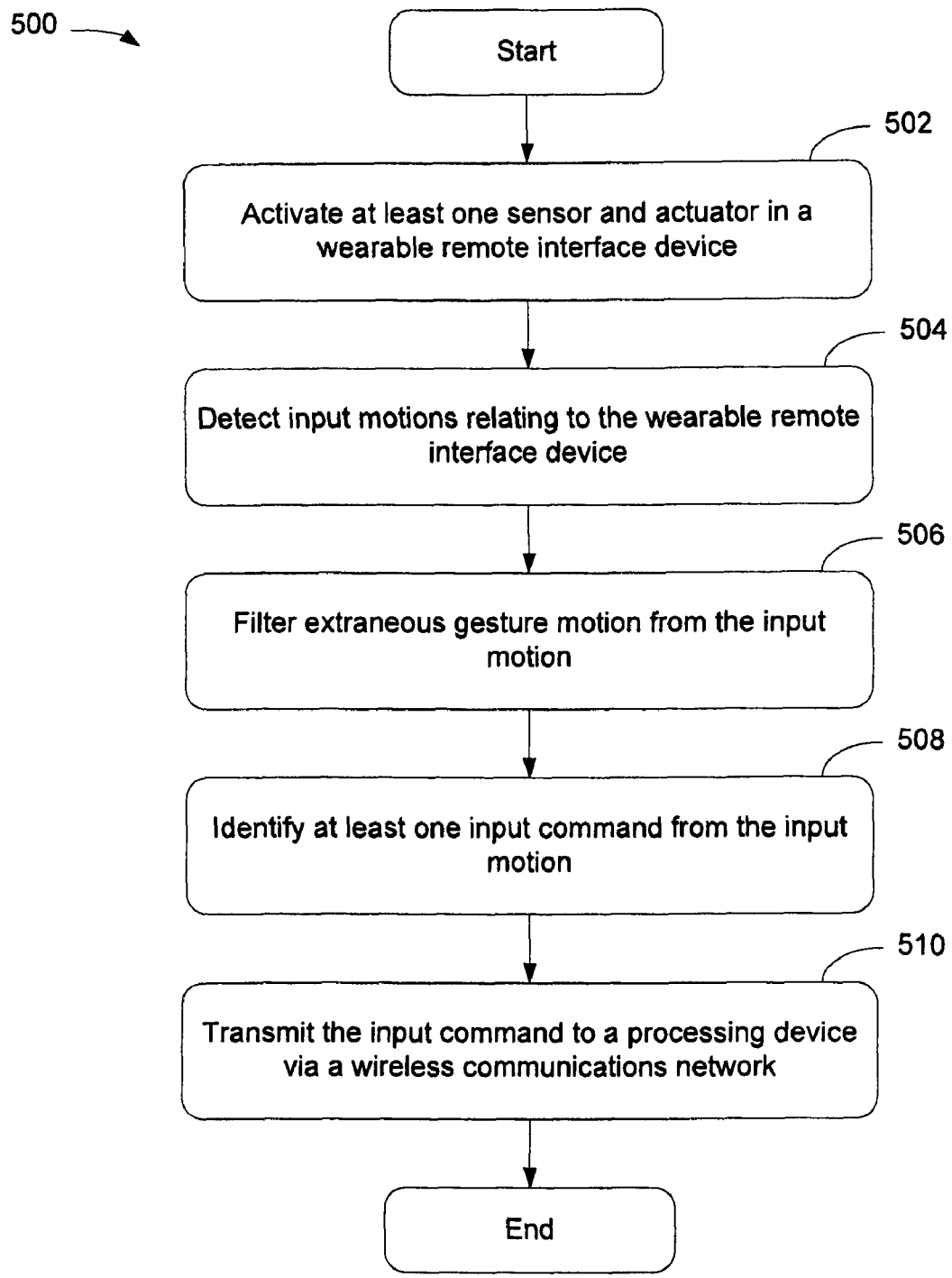
FIG. 5 is a flowchart illustrating a process of providing a remote wearable interface device in accordance with one embodiment of the present invention.

FIG. 5 is a flowchart illustrating a process of communicating with a remote wearable interface device in accordance with one embodiment of the present invention. At block 502, the process activates at least one sensor and one actuator in a wearable remote interface device. It should be noted that the sensor and actuator can be a single device. For example, a piezoelectric material may be used for the sensor/actuator device. After block 502, the process moves to the next block.

At block 504, the process uses sensor(s) to detect various input motions or movements relating to the wearable remote interface device. As described earlier, the wearable remote interface device can be the wearable haptic ring, the haptic finger cap, the haptic fingernail interface device, or the haptic fingernail tip interface device. In one embodiment, the process is capable of sensing a contact between the finger and a surface and identifying the location for which the contact was made. Alternatively, the process is also capable of sensing a collision between the finger and the surface. Furthermore, the process is able to sense or track the physical location of the finger tip relative to the surface. After block 504, the process moves to the next block.

At block 506, the process is configured to filter extraneous gestures or motions from the input motion. In one embodiment, the extraneous gesture or extraneous motion is related to the nature of a hand movement. An input gesture, for example, includes an act of clicking a mouse button or striking a key. Once the extraneous motions are removed, the input motion contains input command(s). After block 506, the process proceeds to the next block.

At block 508, the process identifies one or more input commands from the input motion. In one embodiment, the process identifies the input command(s) from the motions in accordance with the calibration of wearable remote interface device. For example, the wearable remote interface device is calibrated to multiple virtual input devices such as a virtual keyboard and a virtual mouse. After block 508, the process proceeds to the next block.

At block 510, the process transmits the input command(s) to a processing device via a wireless communications network. The processing device can be a server, a PC, a phone, PDA, et cetera. The wireless communications network may use Bluetooth wireless technology. It should be noted that the wearable remote interface device may be attached to any finger. The process, in one embodiment, is configured to calibrate the wearable remote interface device to a virtual mouse with respect to a surface. Alternatively, the process calibrates the wearable remote interface to a virtual keyboard and a virtual mouse with respect to a surface. Upon generating a tactile feedback signal in response to the input command, the process provides tactile feedback via the actuator in accordance with the tactile feedback signal acknowledging the receipt of the input command.

An advantage of the exemplary embodiment(s) of the invention is to improve ergonomics, wherein physical nature of grasping and moving a given mechanism such as mouse, constrains natural motion of a hand, which often leads to repetitive muscle/joints stress and physical injuries such as carpal tunnel syndrome. By removing the constraining mechanism from the interface, the fingertip remote allows a wide range of motion which can be configured to a user's natural range of motions.

Another advantage of the exemplary embodiment(s) of the invention is to eliminate a need for interactive surface. To communicate with a computer, wearable interface device allows a user to use any surface, including users' own fingertips. For example, while a traditional mouse requires motion across a smooth horizontal surface, fingertip remotes or wearable interface devices allow users to use any surface including their fingertips, seatbacks on an airplane, users' legs, or arms.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of the exemplary embodiment(s) of is present invention.

What is claimed is:

1. A system for sensing user input, comprising:
   a touch screen configured to receive touch input;
   a processing device coupled to the touch screen, the processing device configured to generate a haptic feedback signal based on the touch input; and
   a wearable apparatus adapted to be worn on a body part and configured to receive the haptic feedback signal, the wearable apparatus comprising:
   an actuator configured generate a haptic feedback based on the haptic feedback signal.

2. The system of claim 1, wherein the actuator comprises a piezo-electric actuator, a shape-memory alloy actuator, an eccentric rotating mass actuator, or a linear resonant actuator.

3. The system of claim 1, wherein the wearable apparatus is configured as a fingernail tip device.

4. The system of claim 3, wherein the fingernail tip device is adapted to be worn underneath a fingernail.

* * * * *